(12) United States Patent
Cheong et al.

(10) Patent No.: US 7,562,374 B2
(45) Date of Patent: Jul. 14, 2009

(54) FORM FACTOR DISK

(75) Inventors: Woo Seok Cheong, Daejeon (KR); Yong Goo Yoo, Daejeon (KR); Sung Q Lee, Daejeon (KR); Ho Jun Ryu, Seoul (KR); Mun Cheol Paek, Daejeon (KR); Eun Kyoung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 436 days.

(21) Appl. No.: 11/149,098

(22) Filed: Jun. 9, 2005

(65) Prior Publication Data

US 2006/0107279 A1 May 18, 2006

(30) Foreign Application Priority Data

Nov. 17, 2004 (KR) .................. 10-2004-0094284

(51) Int. Cl.
*G11B 25/04* (2006.01)
(52) U.S. Cl. .............. 720/721; 720/718; 360/135
(58) Field of Classification Search .......... 360/135, 360/99.12, 133; 720/718–722; 369/290.1
See application file for complete search history.

(56) References Cited

U.S. PATENT DOCUMENTS

| | | | | | |
|---|---|---|---|---|---|
| 2,694,578 | A | * | 11/1954 | Smith, II | 369/273 |
| 4,149,207 | A | * | 4/1979 | Porter et al. | 360/133 |
| 4,549,922 | A | * | 10/1985 | Oishi et al. | 156/293 |
| 4,562,505 | A | * | 12/1985 | Mroz | 360/135 |
| 4,583,144 | A | * | 4/1986 | Kato | 360/133 |
| 4,999,727 | A | * | 3/1991 | Kato | 360/133 |
| 5,265,086 | A | * | 11/1993 | Ota et al. | 369/284 |
| 5,864,534 | A | | 1/1999 | Fairchild et al. | |
| 6,166,884 | A | * | 12/2000 | Eggebeen et al. | 360/135 |
| 6,285,651 | B1 | * | 9/2001 | Boutaghou et al. | 720/721 |
| 6,292,461 | B1 | | 9/2001 | Kikuchi et al. | |
| 7,027,385 | B1 | * | 4/2006 | Shimazaki et al. | 369/281 |
| 2001/0036149 | A1 | * | 11/2001 | Berg et al. | 369/290 |
| 2003/0157292 | A1 | | 8/2003 | Medower et al. | |
| 2003/0210497 | A1 | * | 11/2003 | Aoishi et al. | 360/133 |

FOREIGN PATENT DOCUMENTS

| | | |
|---|---|---|
| JP | 57 212625 | 12/1982 |
| JP | 63-209083 | 8/1988 |
| JP | 05-114169 | 5/1993 |
| JP | 2004 281477 | 10/2004 |

* cited by examiner

*Primary Examiner*—Craig A Renner
*Assistant Examiner*—Carlos E Garcia
(74) *Attorney, Agent, or Firm*—Ladas & Parry LLP

(57) ABSTRACT

Provided is a form factor disk such as an optical or magnetic disk used in electronic appliances and information appliances. The form factor disk includes: a circular plate having a first hole for inserting a rotational shaft, a plurality of second holes formed adjacent to the first hole, and an information storage region formed at a surface thereof; an upper metal hub located on the circular plate, and having a hole aligned with the first hole of the circular plate and column-shaped joints formed at portions corresponding to the second holes of the circular plate; and a lower metal hub located under the circular plate, and having a hole aligned with the first hole of the circular plate and column-shaped joints formed at portions corresponding to the second holes of the circular plate, wherein the joints of the upper and lower metal hubs are jointed through the second holes.

11 Claims, 3 Drawing Sheets

FORM FACTOR DISK

CROSS-REFERENCE TO RELATED APPLICATION

This application claims priority to and the benefit of Korean Patent Application No. 2004-94284, filed Nov. 17, 2004, the disclosure of which is incorporated herein by reference in its entirety.

BACKGROUND

1. Field of the Invention

The present invention relates to a form factor disk such as an optical or magnetic disk for use in electronic appliances, information appliances and so forth, and more particularly, to an ultra-small form factor disk including a metal hub capable of minimizing a thickness of the disk and simplifying a manufacture process.

2. Discussion of Related Art

As information technology advances, the performance of electronic appliances or information appliances has been rapidly improved, and high integration density for miniaturization has been also rapidly performed. In addition, a typical information storage medium such as a form factor disk has been rapidly minimized and slimmed. As a result, a detachable disk also has been rapidly developed in order to increase user's convenience and effective information transmission.

In general, the form factor disk such as an optical or magnetic disk includes a circular plate 1 made of a polycarbonate material and having a hole 2 at its center as shown in FIG. 1, and upper/lower metal hubs 3 located at upper and lower parts of the circular plate 1 and having a hole 4 aligned with the hole 2 as shown FIG. 2 (see U.S. Patent Application Publication No. 2003/0157292, published on Aug. 21, 2003).

The metal hubs 3 are attached to a magnetic rotational disk (a magnetic chuck) with a rotational shaft of the information appliances being inserted through the holes 2 and 4, and information is stored in an information storage region 5 of the circular plate 1 or the information stored in the information storage region 5 is read out, with the circular plate 1 being rapidly rotated about the rotational shaft depending on rotation of the magnetic rotational disk connected to a spindle motor.

As shown in FIG. 3, the upper and lower metal hubs 3a and 3b are located at the upper and lower parts of the circular plate 1 such that the holes 4 of the upper and lower metal hubs 3a and 3b are aligned with the hole 2 of the circular plate 1, and intermediate layers 6 made of a buffer material (polycarbonate) are inserted between the circular plate 1 and the hubs 3a and 3b.

The process of adhering the metal hubs 3 to the circular plate 1 is a process having the highest degree of difficulty in manufacture of the form factor disk. However, the following problems may be encountered when the disk is manufactured through the conventional method.

First, since the intermediate layers 6 and the metal hubs 3 are layered on the upper and lower parts of the circular plate 1, a center thickness of the disk is increased. When the thickness of the disk becomes larger, since a height of the rotational shaft of the information appliances should be also increased to rotate the disk to make the information appliance thicker, it is difficult to make the appliances ultra-small and ultra-slim.

Second, since the metal hubs 3 are attached to the circular plate 1 through various processes, the productivity is lowered and the manufacturing cost increases. That is, after attaching the intermediate layers 6 between the upper and lower metal hubs 3a and 3b, adhesive epoxy is applied to the intermediate layers 6. Then, the upper and lower metal hubs 3a and 3b are respectively aligned with and attached to the upper and lower part of the circular plate 1. Therefore, a large number of manufacturing processes and difficulties due to the position alignment lower the productivity and increase the manufacturing cost.

SUMMARY OF THE INVENTION

The present invention is directed to a form factor disk capable of directly adhering upper and lower metal hubs without using an intermediate layer and adhesive agent.

One aspect of the present invention is to provide a form factor disk including: a circular plate having a first hole for inserting a rotational shaft, a plurality of second holes formed adjacent to the first hole, and an information storage region formed at a surface thereof; an upper metal hub located on the circular plate, and having a hole aligned with the first hole of the circular plate and column-shaped joints formed at portions corresponding to the second holes of the circular plate; and a lower metal hub located under the circular plate, and having a hole aligned with the first hole of the circular plate and column-shaped joints formed at portions corresponding to the second holes of the circular plate, wherein the joints of the upper and lower metal hubs are jointed through the second holes.

The plurality of second holes may be formed at the same distance from the first hole by the same angular interval, and the distance between the first hole and the second holes may be 2~8 mm.

The joint of the upper metal hub may be formed to have a projection shape, the joint of the lower metal hub may be formed to have a groove shape, and each of the joints of the upper and lower metal hubs may have a diameter of 1~3 mm.

The circular plate may have a recess of a depth of 0.01~0.2 mm at a portion at which the upper and lower metal hubs are located, and an adhesive agent may be applied between the upper and lower metal hubs and the circular plate.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figure 1:
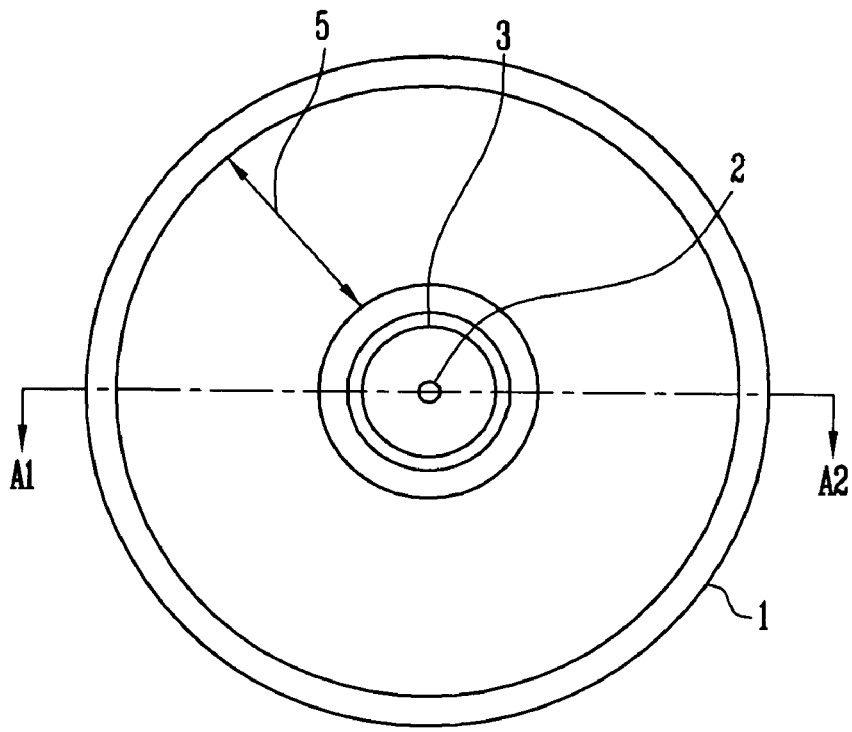
FIG. 1 is a plan view of a conventional form factor disk.
Figure 2:
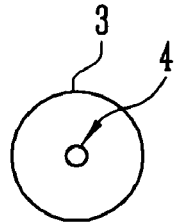
FIG. 2 is a plan view of the metal hub shown in FIG. 1.
Figure 3:
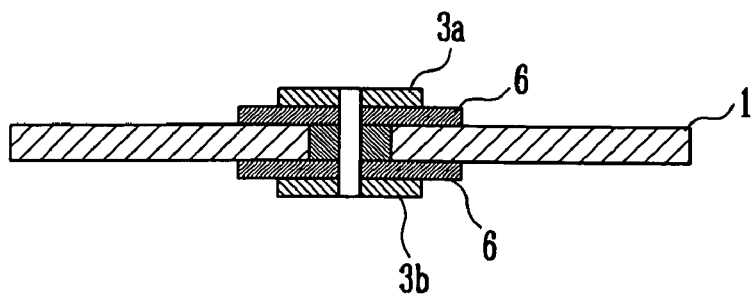
FIG. 3 is a cross-sectional view taken along the line A1-A2 of FIG. 1.
Figure 4:
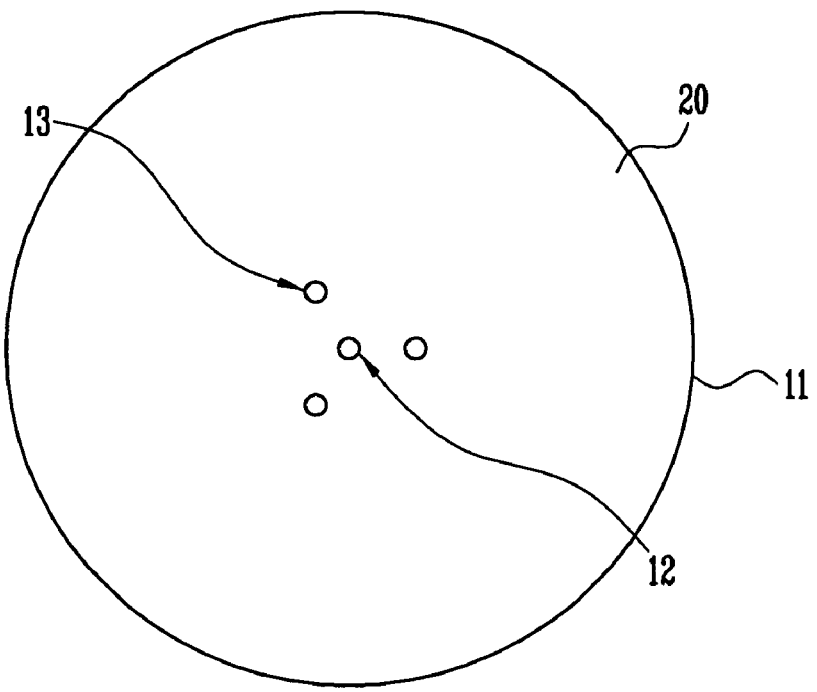
FIG. 4 is a plan view illustrating an embodiment of a circular plate in accordance with the present invention.
Figure 5A:
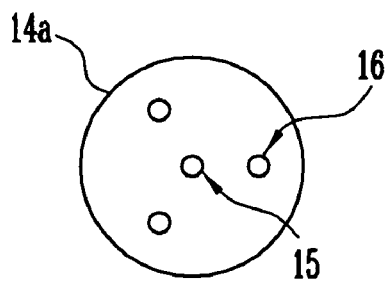
FIGS. 5A and 5B are plan views illustrating embodiments of a metal hub in accordance with the present invention.
Figure 5B:
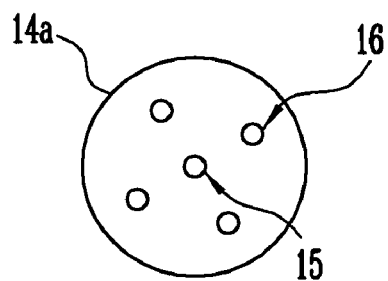
Figure 6:
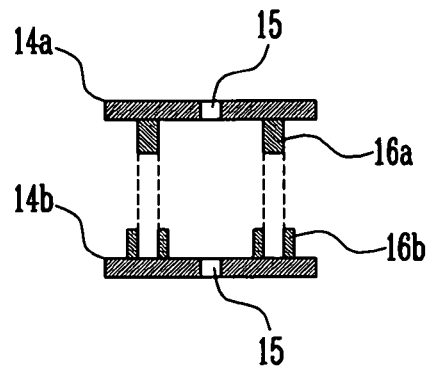
FIG. 6 is a cross-sectional view of a metal hub in accordance with the present invention.

FIG. 4 is a plan view illustrating an embodiment of a circular plate in accordance with the present invention, FIGS. 5A and 5B are bottom plan views of a metal hub, and FIG. 6 is a cross-sectional view of a metal hub.

Figure 7:
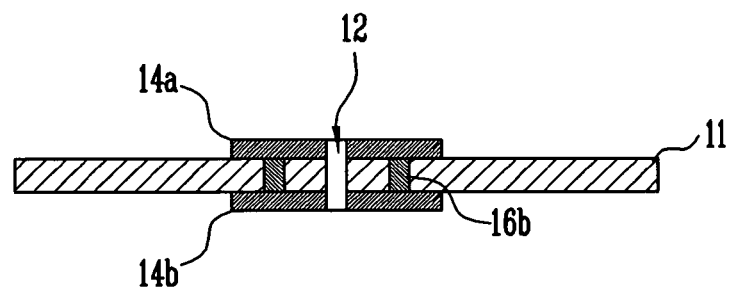
FIG. 7 is a cross-sectional view of a form factor disk in accordance with the present invention.

The form factor disk includes: a circular plate 11 having a hole 12 for inserting a rotational shaft, and a plurality of holes 13 formed adjacent to the hole 12 of the circular plate 11; an upper metal hub 14a located on the circular plate 11, and having a hole 15 aligned with the hole 12 of the circular plate 11 and column-shaped joints 16a formed at portions corresponding to the holes 13 of the circular plate 11; and a lower metal hub 14b located under the circular plate 11, and having a hole 15 aligned with the hole 12 of the circular plate 11 and column-shaped joints 16b formed at portions corresponding to the holes 13 of the circular plate 11, wherein the joints 16a and 16b of the upper and lower metal hubs 14a and 14b are jointed through the second holes 13 of the circular plate 11, as shown in FIG. 7.

The circular plate 11 is made of polycarbonate and so on, and is formed to have a diameter of 20~80 mm and a thickness of 0.3~3.0 mm. In addition, the holes 13 are formed apart from the hole 12 by a distance of 2~8 mm. At this time, preferably, the holes 13 and the hole 12 are formed to have the same distance and the same angular interval in order to prevent the disk from deviating or vibrating during its high-speed rotation. FIG. 5A illustrates the upper metal hub 14a when the holes 13 and the hole 12 are formed to have an angular interval of 120 degrees, and FIG. 5B illustrates the upper metal hub 14a when the holes 13 and the hole 12 are formed to have an angular interval of 90 degrees.

Each of the upper and lower metal hubs 14a and 14b is formed to have a diameter of 6~20 mm and a thickness of 0.05~0.5 mm. The hole is formed to have a diameter of 1~3 mm. The joint 16a of the upper metal hub 14a is formed to have a projection shape, and the joint 16b of the lower metal hub 14b is formed to have a groove shape so that the joint 16a of the upper metal hub 14a is inserted into the joint 16b of the lower metal hub 14b to be fixed thereto. On the contrary, the joint 16a of the upper metal hub 14a may be formed to have a groove shape, and the joint 16b of the lower metal hub 14b may be formed to have a projection shape so that the joint 16b of the upper metal hub 14b is inserted into the joint 16a of the lower metal hub 14a to be fixed thereto. In addition, an adhesive agent such as epoxy may be applied between the upper and lower metal hubs 14a and 14b and the circular plate 11 so that the joints 16a and 16b of the upper and lower metal hubs 14a and 14b are jointed through the holes 13. The joints 16a and 16b of the upper and lower metal hubs 14a and 14b may be formed to have a diameter of 1~3 mm.

Figure 8:
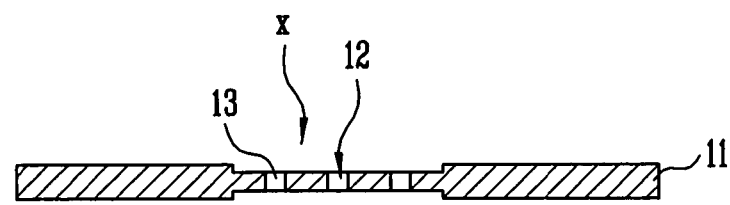
FIG. 8 is a plan view illustrating another embodiment of a circular plate in accordance with the present invention.

FIG. 8 is a cross-sectional view of a circular plate 11 in accordance with another embodiment of the present invention.

Figure 9:
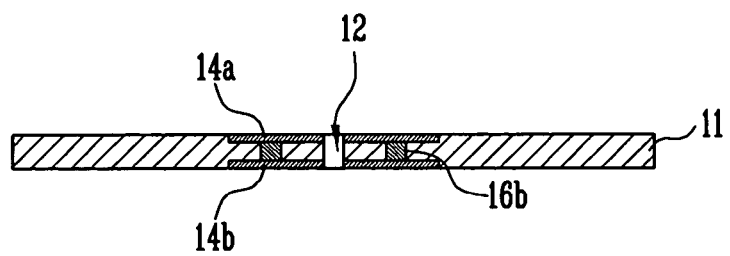
FIG. 9 is a cross-sectional view of a form factor disk in accordance with another embodiment of the present invention.

Referring to FIG. 8, the circular plate 11 has a recess (X portion in FIG. 8) of a depth of 0.01~0.2 mm at a portion where the upper and lower metal hubs 14a and 14b are jointed. In this case, the upper and lower metal hubs 14a and 14b may be jointed as shown in FIG. 9 to minimize the thickness of the form factor disk.

A rotational shaft of an information appliance is inserted through the holes 12 and 15 of the form factor disk, and the upper or lower metal hub 14a or 14b is attached to a magnetic rotational disk (a magnetic chuck) of the information appliance. Then, as the magnetic rotational disk connected to a spindle motor is rotated, the circular plate 11 is rotated at a high speed about the rotational shaft so that information can be stored in an information storage region 20 of the circular plate 11 and can be read out from the information storage region 20.

As can be seen from the foregoing, the present invention is capable of obtaining the following effects by directly jointing the upper and lower metal hubs through the holes without using an adhesive agent.

First, it is possible to minimize the thickness of the disk without inserting an intermediate layer between the circular plate and the metal hubs. When the recess is formed at the circular plate, the disk has a thickness equal to the thickness of the jointed hubs so that a surface of the hub and the information storage surface are located on the same plane. Therefore, it is possible to implement an ultra-small and ultra-slim information storage device.

Second, it is possible to simplify overall processes by omitting the processes of attaching the metal hubs and the intermediate layer, applying the adhesive agent, aligning the metal hubs, and so on. Therefore, it is also possible to improve the productivity, decrease the manufacturing cost, and increase the product price and quality competitiveness.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A form factor disk comprising:
   a circular plate having a first hole for inserting a rotational shaft, a plurality of second holes adjacent to the first hole, and an information storage region on a surface thereof;
   an upper metal hub located on the circular plate, the upper metal hub comprising:
     an upper hub hole aligned with the first hole of the circular plate; and
     upper connectors formed on a lower surface of the upper metal hub to correspond to the second holes of the circular plate such that the upper connectors project out and away from the upper metal hub and extend below the upper metal hub and within and through the second holes; and
   a lower metal hub located under the circular plate, the lower metal hub comprising:
     a lower hub hole aligned with the first hole of the circular plate; and
     lower connectors formed on an upper surface of the lower metal hub to correspond to the second holes of the circular plate such that the lower connectors project out and away from the lower metal hub and extend above the lower metal hub and within and through the second holes, wherein the upper connectors and the lower connectors are mated within and through the second holes, such that the upper connectors do not penetrate the lower metal hub from which the lower connection members project and the lower connectors do not penetrate the upper metal hub from which the upper connection members project, and such that the upper and lower hubs are securely fitted to the upper and lower sides of the circular plate respectively.

2. The form factor disk according to claim 1, wherein the circular plate is made of polycarbonate and has a diameter of 20~80 mm and a thickness of 0.3~3.0 mm.

3. The form factor disk according to claim 1, wherein the plurality of second holes are formed at the same distance from the first hole by the same angular interval.

4. The form factor disk according to claim 1, wherein the distance between the first hole and each of the second holes is 2~8 mm.

5. The form factor disk according to claim 1, wherein each of the upper and lower metal hubs has a diameter of 6~20 mm and a thickness of 0.05~0.5 mm.

6. The form factor disk according to claim 1, wherein each of the lower and upper hub holes has a diameter of 1~3 mm.

7. The form factor disk according to claim 1,
wherein any one of the upper connectors is formed to have either a male-type projection shape or a female-type groove shape, and
wherein each of the lower connectors is formed to have a shape opposite to that of the corresponding upper connector.

8. The form factor disk according to claim 1, wherein each of the upper and lower connectors has a diameter of 1~3 mm.

9. The form factor disk according to claim 1, wherein the circular plate has a upper recess and a lower recess, each having a depth of 0.01~0.2 mm, so as to accommodate therein the upper and lower metal hubs respectively, wherein only a portion of an upper portion and a lower portion of the circular plate is recessed such that the upper and lower recesses together do not penetrate entirely through the circular plate, and such that the bottom portion of the upper metal hub is disposed on the upper recess and the upper portion of the lower metal hub is disposed on the lower recess, and wherein the upper recess and the lower recess each extend over the second holes such that the upper and lower connectors are mated between the upper metal hub and the lower metal hub such that the upper and lower hubs are securely fitted to the upper and lower surfaces of the circular plate respectively.

10. The form factor disk according to claim 1, wherein an adhesive agent is applied between each of the upper and lower metal hubs and the circular plate.

11. The form factor disk according to claim 1, wherein the first hole forms inner side surfaces of the form factor disk, and the inner side surfaces of the form factor disk are the same as those of the upper hub hole and the lower hub hole.

* * * * *